UNITED STATES PATENT OFFICE.

JOHN W. LITTLEFORD, OF SAN FRANCISCO, CALIFORNIA, ASSIGNOR TO MINERALS SEPARATION, LIMITED, OF LONDON, ENGLAND.

ORE CONCENTRATION.

1,142,822.　　Specification of Letters Patent.　Patented June 15, 1915.

No Drawing.　Application filed December 15, 1913. Serial No. 806,770.

*To all whom it may concern:*

Be it known that I, JOHN W. LITTLEFORD, a citizen of the United States, and a resident of the city and county of San Francisco, State of California, have invented certain new and useful Improvements in Ore Concentration, of which the following is a specification.

The invention relates to improvements in the art of separating valuable mineral from ore slimes.

The object of the invention is to render the slimes more amenable to the separation of the valuable mineral therefrom.

In concentrating or separating the valuable mineral from ores containing the same, the ores are usually ground or pulverized in order that the valuable mineral may be released. The ore is mixed with water either during or after the pulverizing operation and the valuable mineral or a portion of the valuable mineral is separated therefrom. In grinding the ore to a certain fineness, for instance to such a fineness that the particles will pass through a screen having fifty openings to the linear inch, some of the ore is ground very much finer than this and the finely ground valuable mineral particles are very difficult of recovery. These finely ground particles of the ore, which consist chiefly of silica, silicates or other gangue matter, and some valuable mineral, are carried over the concentrating tables or apparatus with but small recovery of the valuable portion. Some of the finely ground silicious or gangue matter, when mixed with water, forms a slime which settles slowly in water and retards the settlement of the fine valuable mineral particles, preventing them from being readily separated.

I have found that if the fine slimes in the ore pulp can be coagulated or brought into a flocculent condition, they do not exert so great a retarding effect in the settlement of the valuable mineral and that the valuable mineral can be more readily recovered on concentrating tables or otherwise. The silicious or gangue slimes are coagulated or gelatinized or both by adding to or mixing with the ore pulp, which contains the slimes and some valuable mineral and other material, a small amount of saponaceous material or soap, either in the form of an emulsion or otherwise. The saponaceous material which I employ is preferably a tallow soap, containing fatty acids, chiefly stearic acid, and a small amount of sodium, although it may contain other ingredients. The small proportion of soap or soap emulsion is added to or mixed with the pulp and the mass stirred or agitated or both to bring the soap particles into contact with all portions of the slimes and the slimes quickly coagulate or become flocculent and settle with comparative rapidity. When the slimes are in this condition their retarding or holding effect on the valuable mineral is very much lessened, so that the valuable mineral may be more readily separated. The ore pulp may then be delivered to concentrating tables or other concentrating apparatus and is in better condition for separating out valuable mineral on these devices than it was before the addition of the soap. The water containing the soap which flows from the concentrating apparatus is not impoverished of its soap and may be used over again, thus reducing the cost of the process.

From the nature of the process, and the varying conditions under which it must necessarily be employed in practical mining, it is apparent that no definite proportions can be established. The proportions to be used are determined from experiment on different ores to determine the requisite proportions for accomplishing the desired result on each ore.

By using an emulsion of saponaceous material, water and hydrocarbon oil of which thick pine oil is an example, I find that the action of coagulating and precipitating the slimes is hastened, so that in practice it may be advisable to employ the emulsion, instead of the soap alone. The emulsion preferably contains pine oil, anhydrous soap and water, in the proportion of thirty-two parts by weight of pine oil, nine parts by weight of anhydrous soap, and fifty-nine parts by weight of water, to which is added sufficient liquid to bring the emulsion to the desired consistency. A very small quantity of the soap or emulsion in proportion to the slimes is sufficient to produce the desired coagulation. I have found that with an ore pulp containing silica, silicates, copper sulfid mineral and iron sulfid minerals, that the desired effect is obtained by adding to a ton of dry slimes, one-half pound or less of an emulsion consisting of three parts by weight of water and one part by weight of the pine oil and soap emulsion.

1. The hereindescribed process for separating the valuable metalliferous constituents from the gangue slimes contained in ore pulp which consists in coagulating the said gangue slimes by adding to the ore pulp an emulsion of a soap and pine oil, and separating the coagulated gangue from the metalliferous constituents of the pulp.

2. The hereindescribed process for separating the valuable metalliferous constituents from the gangue slimes contained in ore pulp which consists in adding to the ore pulp an emulsion of soap and pine oil in approximately the proportions by weight of 32 parts pine oil, 9 parts anhydrous soap, and 59 parts water, and thereafter separating the coagulated gangue from the metalliferous constituents of the ore pulp.

3. The hereindescribed process for separating the valuable metalliferous constituents from the colloidal silica slimes contained in ore pulp which consists in coagulating the said colloidal gangue slimes by adding to the ore pulp an emulsion of a soap and pine oil, and separating the coagulated gangue from the metalliferous constituents of the pulp.

4. The hereindescribed process for separating the valuable metalliferous constituents from the colloidal silica slimes contained in ore pulp which consists in coagulating the slimes by adding to the ore pulp an emulsion of soap and pine oil in approximately the proportions by weight of 32 parts pine oil, 9 parts anhydrous soap and 59 parts water and thereafter separating the valuable metalliferous constituents from the coagulated silica slimes.

In testimony whereof, I have hereunto set my hand at San Francisco, California, this 9th day of December 1913.

JOHN W. LITTLEFORD.

In presence of—
H. G. Prost,
W. W. Healey.

---

Correction in Letters Patent No. 1,142,822.

It is hereby certified that in Letters Patent No. 1,142,822, granted June 15, 1915, upon the application of John W. Littleford, of San Francisco, California, for an improvement in "Ore Concentration," an error appears in the printed specification requiring correction as follows: Page 2, after line 3, insert the words *I claim:—*; and that the said Letters Patent should be read with this correction therein that the same may conform to the record of the case in the Patent Office.

Signed and sealed this 6th day of July, A. D., 1915.

[SEAL.]

R. F. WHITEHEAD,
*Acting Commissioner of Patents.*